United States Patent [19]

Pons et al.

[11] Patent Number: 5,041,174

[45] Date of Patent: Aug. 20, 1991

[54] INSERT FOR THE CONNECTION OF A MANGANESE STEEL PART TO A CARBON STEEL PART

[75] Inventors: Fernand Pons, Alisay; Yvon Delayen, Beaurainville, both of France

[73] Assignee: Manoir Industries, S.A., Paris-Cedex, France

[21] Appl. No.: 373,164

[22] Filed: Jun. 29, 1989

[30] Foreign Application Priority Data

Apr. 5, 1989 [FR] France .................... 89 04481

[51] Int. Cl.⁵ .................................. C22C 38/58
[52] U.S. Cl. .................................. 148/327; 420/56
[58] Field of Search ..................... 420/56; 148/327

[56] References Cited

U.S. PATENT DOCUMENTS

| 3,736,131 | 5/1973 | Espy | 420/56 |
| 4,828,630 | 5/1989 | Daniels et al. | 420/56 |

FOREIGN PATENT DOCUMENTS 56-119724  9/1981  Japan ................... 148/327

Primary Examiner—Deborah Yee
Attorney, Agent, or Firm—Kenyon & Kenyon

[57] ABSTRACT

An insert for connecting a part made from a steel containing 12–14% by weight of manganese to at least one carbon steel part, said insert being made from an austenitic-ferritic alloy having the following chemical composition (in % by weight):

| Carbon | 0.025–0.035% |
| Manganese | 6–11% |
| Silicon | 0.5–1.5% |
| Nickel | 5–8% |
| Chromium | 17.5–20% |
| Molybdenum | <0.5% |
| Nitrogen | 0.12–0.20% |
| Phosphorus and sulfur | ≦0.030% | and the delta ferrite content of which (in percent by volume) as measured by micrographic counting ranges between about 5% and 15%.

4 Claims, 3 Drawing Sheets

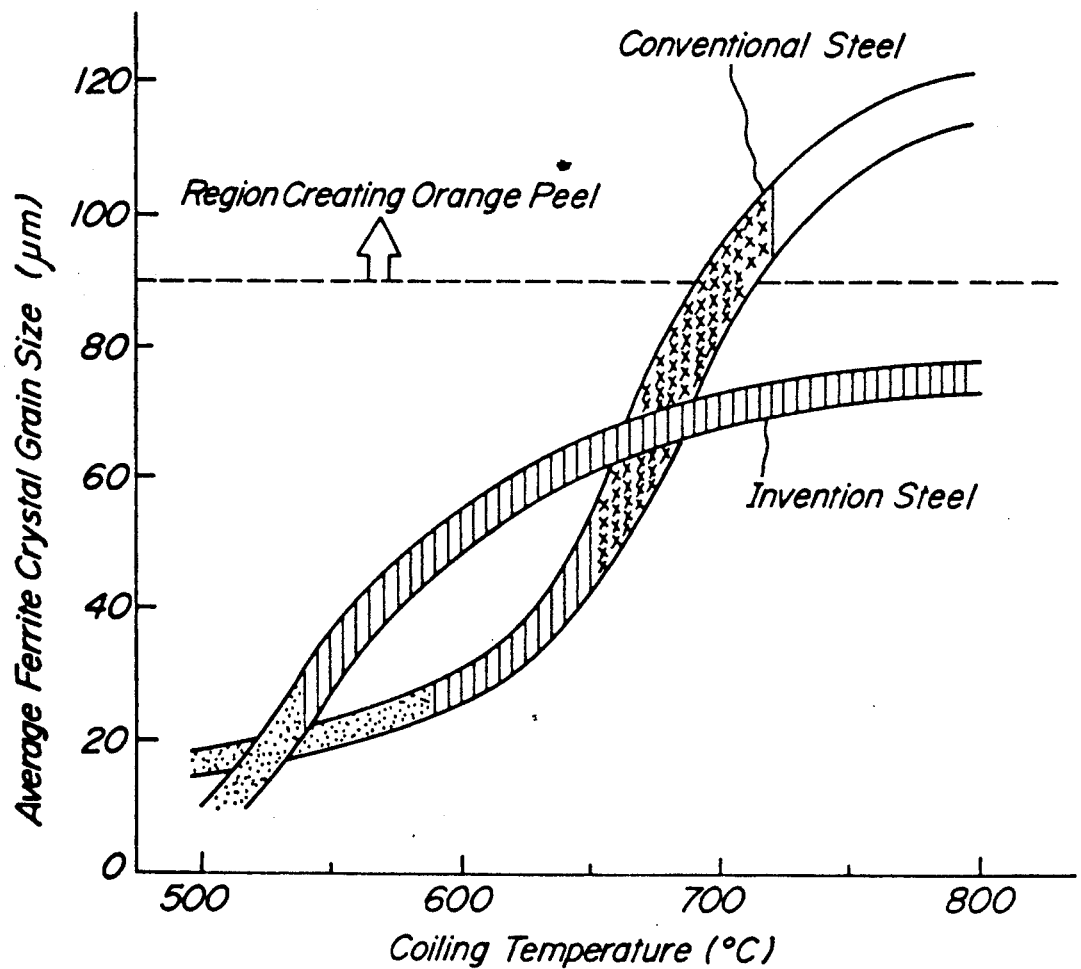

FIG_2
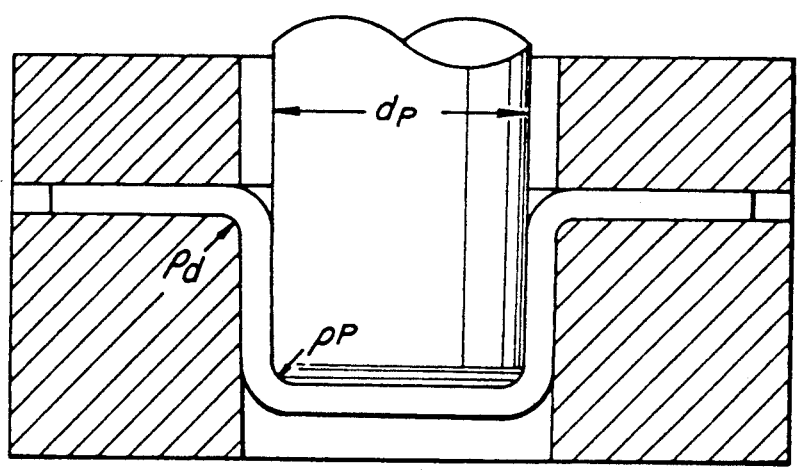

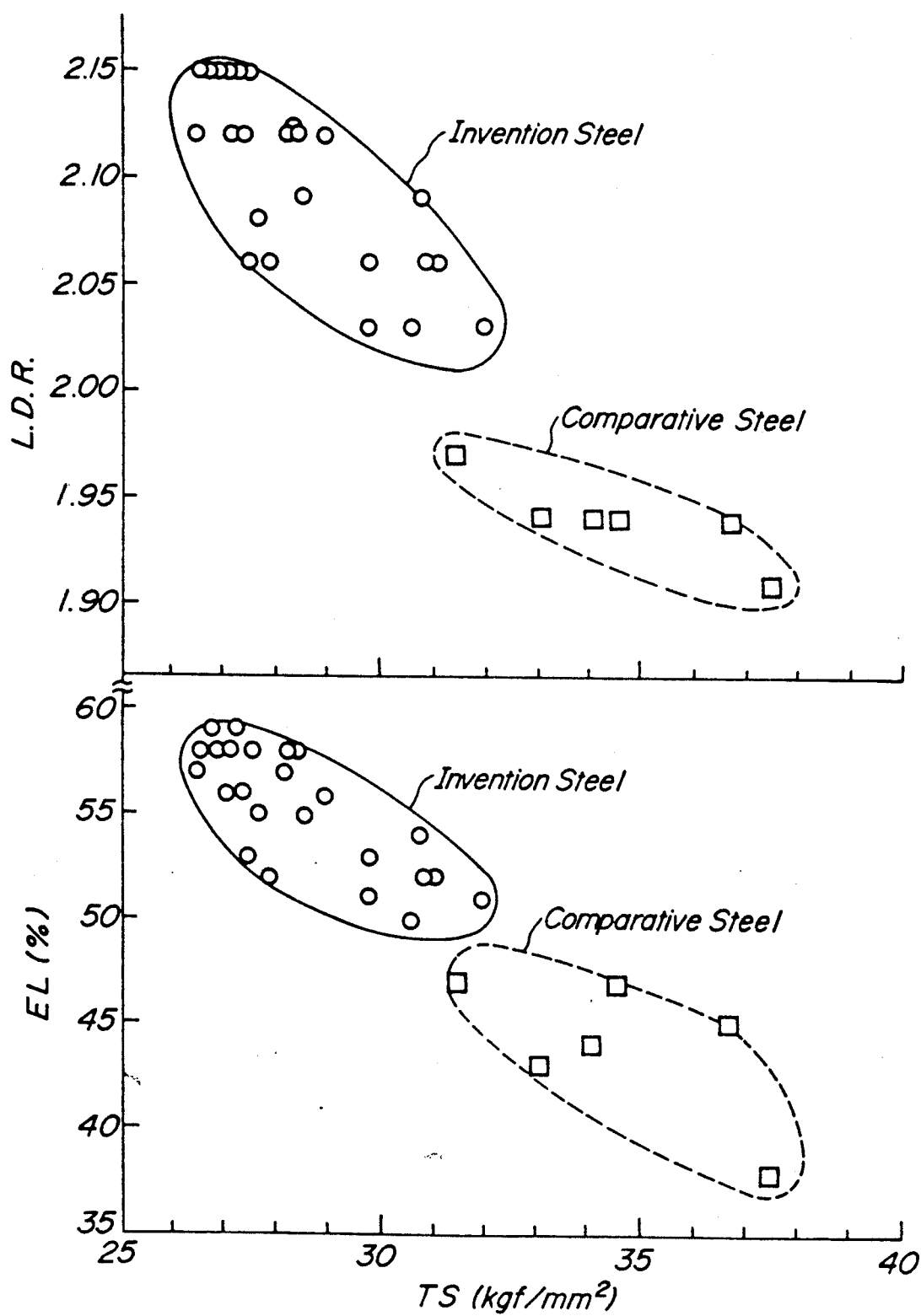
FIG_3

INSERT FOR THE CONNECTION OF A MANGANESE STEEL PART TO A CARBON STEEL PART

The present invention relates essentially to an insert for the connection of a manganese steel part such for instance as a railway track part forming a common crossing to one or several other parts made from carbon steel such for instance as the rails of the railroad networks or systems.

The invention is also directed to a method of connecting two or more parts by means of this insert as well as to the assembly obtained by this process.

It is known that it is not possible to weld rails of railway tracks directly onto railway track parts made from a steel containing 12% to 14% by weight of manganese because by proceeding that way the mechanical qualities of the railway track parts would be seriously altered in view of the thermal shocks produced by the successive operating steps of welding and hardening or chilling.

Therefore to solve this problem there has already been proposed to weld the ends of the manganese steel railway track parts to the ends of steel rails through the agency of an intermediate connecting steel element or insert of a suitable grade.

It has however not yet been proposed to use for making the connecting insert a specific alloy giving the insert qualities providing same with a high modulus of elasticity and a high elastic limit as well as a superficial hardening upon use so that the wearing face of the insert would always exhibit an outstanding continuity with those of the railway track part and the rail.

The goal or aim of the present invention is therefore to fill in that gap.

For that purpose the invention has for its object an insert for the connection of a part made of steel containing from 12% to 14% by weight of manganese to at least another part made of carbon steel, characterized in that it is made from an austenitic-ferritic alloy which has the following chemical composition (in % by weight):

| | |
|---|---|
| Carbon | 0.025–0.035% |
| Manganese | 6–11% |
| Silicon | 0.5–1.5% |
| Nickel | 5–8% |
| Chromium | 17.5–20% |
| Molybdenum | <0.5% |
| Nitrogen | 0.12–0.20% |
| Phosphorus and sulfur | ≦0.030% | and the delta ferrite content of which as measured by counting ranges between about 5% and 15%.

This insert is further characterized by the fact that it undergoes a hyperquench or a hyperhardening consisting in keeping same at a temperature ranging between about 1,030° C. and 1,100° C. for about two hours, which maintaining is followed by a stop or discontinuance by water.

The invention is also directed to a method of connection of a manganese steel part such for instance as a railway track part to at least another part made from carbon steel such for instance as a railway track rail through the medium of an insert meeting the characterizing features defined hereinabove, this method being characterized in that said insert obtained through molding is at first welded onto the carbon steel part to build up a sub-assembly which undergoes a thermal treatment consisting in a controlled cooling from about 900° C. down to the ambient or room temperature before being welded to the manganese steel part.

According to a characterizing feature of this process the weld between the insert and the manganese steel part undergoes no other heat treatment than a cooling down through the ambient air.

In the accompanying drawing is shown a micrography of an exemplary insert corresponding to the following analysis:

Carbon = 0.03%
Manganese = 6.2%
Silicon = 0.80%
Nickel = 7.5%
Chromium = 19.20%
Molybdenum = 0.02%
Nitrogen = 0.13%
phosphorus < 0.03% and the delta ferrite content of which as measured by counting is equal to 6.1%.

The invention is further directed to an assembly of at least two parts obtained by the method referred to hereinabove and more particularly to the assembly consisting of a railway track part and of several rails connected to this part by means of the special insert according to the invention.

The invention will be better understood and further objects, characterizing features, details and advantages of the insert, of the method of connection and of the assembly according to this invention will appear more clearly as the following explanatory detailed description proceeds.

It should at first be pointed out that the steel parts to be connected through the agency of the insert may have been subjected to any suitable treatment whatsoever.

More specifically the part made of a steel containing 12% to 14% by weight of manganese may have been subjected to a surface hardening after hyperquenching by any suitable method such as hammering, pressing, explosion or any other process.

As to the carbon steel part, it may also have been treated by any suitable method to increase its hardness.

The insert according to the invention is obtained by molding of an austenitic-ferritic stainless steel which has the chemical composition previously stated and the ferrite content of which as measured by counting may range between about 6% and 10%. The weight ratios of the carbon-manganese-silicon-nickel-chromium-molybdenum and nitrogen components in particular give the insert a high modulus of elasticity and a high elastic limit as well as a surface hardening upon use which is particularly advantageous in the application contemplated as will be described hereinafter.

It should be added that the insert molded in the desired grade undergoes a hyperquenching treatment which consists in maintaining the insert at a temperature ranging between 1,030° C. and 1,100° C. for two hours after which there is made a stop with water.

There will now be described how is carried out the connection by means of the insert referred to hereinabove of a part made of a steel containing 12% to 14% by weight of manganese which may be a railway track part to one or several other parts made from carbon steel which may be rails.

At first, the insert is welded to the end of the carbon steel part or rail, it being understood that the insert has been carefully machined to give it the desired dimensional accuracy in relation to the parts to be fitted together.

This welding may be carried out by a suitable welding method such for instance as electrode or wire arc welding, aluminothermy, flash welding, bombardment with electrons, plasma torch welding, etc.

Once the welding of the insert onto the carbon steel part has been performed, this sub-assembly is subjected to a thermal treatment with heat supply in time-controlled relationship so as to comply with the metallurgical requirements peculiar to the carbon steel subjected to a sudden increase in temperature.

More specifically, this treatment consists in a controlled cooling down of the aforesaid sub-assembly from about 900° C. down to the ambient or room temperature.

Such a treatment advantageously avoids the occurrence of quenching components in the transition zone towards the rail, which components would embrittle the assembly.

Then, the rail-insert sub-assembly is put to the required size and the weld is controlled by means of a non-destructive test means. The sub-assembly is afterwards welded through the insert onto the manganese steel part, i.e. the railway track part. This latter welding which is performed by any suitable welding means as previously set forth is not subjected to any special heat treatment other than a simple cooling down in the ambient air. The assembly thus obtained exhibits all the desired mechanical strength and safety qualities.

This is due in particular to the fact that the property of the alloy used for the insert would remove any risk of heat cracking during the operating steps of welding the insert onto the rail and onto the railway track part. Moreover, the alloy constituting the insert provides this insert with properties of hardening upon use thereby allowing its length to be not limited while giving its wearing face a perfect continuity with the wearing faces of the rail and of the railway track part.

It should be understood that the invention comprises all the means constituting technical equivalents of the means described as well as their combinations if the latter are carried out according to its gist and within the scope of the appended claims.

What is claimed is:

1. An insert for the connection of a part made of a steel containing from 12 to 14% by weight of manganese to at least another part made from carbon steel, wherein the improvement consists in that said insert is made from an austenitic-ferritic alloy which has the following chemical composition.

|  | % by weight |
| --- | --- |
| Carbon | 0.025–0.035 |
| Manganese | 6–11 |
| Silicon | 0.5–1.5 |
| Nickel | 5–8 |
| Chromium | 17.5–20 |
| Molybdenum | <0.5 |
| Nitrogen | 0.12–0.20 |
| Phosphorous and sulfur | ≦0.030 | and the delta ferrite content of which (in percent by volume) as measured by micrographic counting ranges between 5% and 15% with the balance being austenite.

2. An insert according to claim 1, having undergone hyperquenching wherein said insert is allowed to stand at a temperature in the range of from about 1.030° to about 1.100° C. for about two hours, said hyperquenching being stopped with water.

3. An insert according to claim 1, which has the following composition:

|  | % by weight |
| --- | --- |
| Carbon | 0.030 |
| Manganese | 6.20 |
| Silicon | 0.80 |
| Nickel | 7.5 |
| Chromium | 19.20 |
| Molybdenum | 0.02 |
| Nitrogen | 0.13 |
| Phosphorous and sulfur | ≦0.030 | and the delta ferrite content of which (in percent by volume) as measured by micrographic counting is equal to 6.1%.

4. An insert for the connection of a part made of a steel containing from 12 to 14% by weight of manganese to at least another part made from carbon steel, wherein the improvement consists in that said insert is made from an austenitic-ferritic alloy which has the following chemical composition:

|  | % by weight |
| --- | --- |
| Carbon | 0.025–0.035 |
| Manganese | 6–11 |
| Silicon | 0.5–1.5 |
| Nickel | 5–8 |
| Chromium | 17.5–20 |
| Molybdenum | <0.5 |
| Nitrogen | 0.12–0.20 |
| Phosphorous and sulfur | ≦0.030 | and the delta ferrite content of which (in percent by volume) as measured by micrographic counting ranges between 6% and 10% with the balance being austenite.

* * * * *

UNITED STATES PATENT AND TRADEMARK OFFICE
CERTIFICATE OF CORRECTION

PATENT NO. : 5,041,174
DATED      : August 20, 1991
INVENTOR(S) : Fernand PONS, et al It is certified that error appears in the above-identified patent and that said Letters Patent is hereby corrected as shown below:

On the title page;

| TITLE PAGE [73] | | Assignee: After "Manoir Industries" delete "S.A.,". |
|---|---|---|
| Column | Line | |
| 1 | 53 | After "which" insert --(in percent by volume)--; after "measured by" insert --micrographic--. |
| 2 | 2 | After "consisting" change "in" to --of--. |
| 2 | 61 | After "how" delete "is carried out". |
| 2 | 62 | After "connection" insert --is carried out--. |

Signed and Sealed this

Fifteenth Day of September, 1992

Attest:

DOUGLAS B. COMER

*Attesting Officer*        *Acting Commissioner of Patents and Trademarks*